United States Patent

Romero et al.

[11] Patent Number: 5,343,778
[45] Date of Patent: Sep. 6, 1994

[54] MULTIFUNCTION SECONDARY POWER SYSTEM

[75] Inventors: Daniel Romero, Mesa; Ronald J. Kubinski, Tempe; Durward S. Benham, Jr., Phoenix, all of Ariz.; Michael S. Koerner, Harbor City; Scott J. Goldberg, West Minster, both of Calif.; Barry J. Kingery, Phoenix, Ariz.

[73] Assignee: AlliedSignal Inc., Morris Township, Morris County, N.J.

[21] Appl. No.: 973,502

[22] Filed: Nov. 9, 1992

[51] Int. Cl.$^5$ .............................................. F16H 37/06
[52] U.S. Cl. ..................................... 74/661; 60/39.15
[58] Field of Search ............... 74/661; 60/39.14, 39.15

[56] References Cited

U.S. PATENT DOCUMENTS

| | | | |
|---|---|---|---|
| 2,723,531 | 11/1955 | Wosika et al. | 60/39.15 X |
| 3,782,223 | 1/1974 | Watson | 74/661 X |
| 4,713,982 | 12/1987 | Fluegel et al. | 60/39.142 X |
| 4,864,812 | 9/1989 | Rodgers et al. | 60/39.15 X |
| 5,085,071 | 2/1992 | Mizushima et al. | 74/661 X |

Primary Examiner—Dirk Wright
Attorney, Agent, or Firm—Jerry J. Holden; James W. McFarland; Robert A. Walsh

[57] ABSTRACT

A multifunction secondary power system (10) for use aboard an aircraft or other vehicle provides the functions both of an auxiliary power unit and of an emergency power unit. The power system (10) includes two turbine engines (12, 22) operable under differing conditions, a gearbox (34) receiving power from the two engines (12, 22) selectively through overrunning clutches (74, 84), and a plurality of accessory devices (36, 38, 40) receiving shaft power from either of the two engines (12, 22) through the gearbox (34). The gear box (34) includes a third clutch (64) operably interposed between the clutches (74, 84) which selectively delivers shaft power from the engine (22) to the engine (12) to affect the start thereof.

5 Claims, 2 Drawing Sheets

MULTIFUNCTION SECONDARY POWER SYSTEM

TECHNICAL FIELD

The present invention relates to secondary power systems, for aircraft and other vehicles, that combine an auxiliary power unit (APU) with an emergency power unit (EPU), and in which the EPU is utilized to start the APU through a three clutch gearbox.

BACKGROUND OF THE INVENTION

Aircraft, as well as other vehicles, have primary power systems in the form of piston or gas turbine engines that provide, in addition to propulsion, shaft power to drive accessories such as electric generators and hydraulic pumps. These vehicles may also have a secondary power system as back up to the primary power system for when the aircraft is on the ground and the primary power system is shut down or during an inflight emergency.

APUs are air breathing gas turbine engines commonly used as secondary power systems. The APU provides shaft power to drive electrical generators, hydraulic pumps and other equipment requiring constant speed operation. The APU can also provide pressurized air for main engine starting, cabin air-conditioning and pressurization, de-icing, and air turbine motors. Historically, APU's have only been operated when the aircraft was on the ground. However, recent advances have extended the operating envelop of the APU so that it can now be started and operated at altitudes of about 45,000 ft. Nonetheless, a starter motor is required to accelerate the APU to its light off speed. With conventional starter motors, it takes about 30 seconds to a minute, depending on ambient conditions, before the APU can generate power. In addition, the APU is sensitive to aircraft attitude. For example, should the aircraft go into a spin the air entering the APU may be sufficiently distorted as to prevent the starting of the APU.

Aerodynamically unstable aircraft need a secondary power system that can provide power within 3-4 seconds at any altitude or aircraft attitude. Without hydraulic power to move control surfaces, or electrical power for flight control computers, these aircraft cannot be maintained in controlled flight. To meet these conditions, these aircraft have employed EPUs, instead of APUs, as secondary power systems.

An EPU is comprised of a combustor, a turbine wheel and a stored propellant either a monopropellant such as hydrazine, or bi-propellant such as jet fuel and air. When power is required, the propellant enters the combustor is reacted and then drives the turbine wheel which delivers shaft power to drive electrical generators, hydraulic pumps and other equipment requiring constant speed operation. The operation of the EPU is independent of ambient conditions and it can deliver power in 3-4 seconds. However, the EPU can only operate for the short period of time until the stored propellant is spent and therefore cannot perform many of the other functions required of a secondary power system such as main engine starting.

U.S. Pat. No. 4,864,812 discloses a combined auxiliary and emergency power unit. In an emergency, the EPU provides power until the APU can be started. However, an air turbine starter, hydraulic starter or electric starter is still required to start the APU. These starters not only add weight to the system but also decrease the system's reliability, maintainability and serviceability.

Accordingly, there is a need for a secondary power system that combines an APU with an EPU but does not require a separate starter for the APU.

SUMMARY OF THE INVENTION

An object of the present invention is to provide a combined APU/EPU secondary power system that does not have a separate starter for the APU.

Another object of the present invention is to provide a combined APU/EPU secondary power system that weighs less and is more reliable.

Yet another object of the present invention is to provide a method for starting an APU by using an EPU.

The present invention achieves these objects by providing a combined APU/EPU secondary power system having a pair of one-way overrunning clutches carried within a gearbox, each of the pair of clutches being disposed to transmit power to the accessories from the APU or EPU while preventing power transmission between the APU and EPU. In addition, a third overrunning clutch and a separate geartrain transmit power from the EPU to the APU to initiate an APU start, thus eliminating the need for starter. This third clutch allows the EPU to power the APU at less than the APU's rated speed which reduces its aerodynamic drag on the EPU. This in turn reduces the size and weight of the EPU, the storage containers and the recharge compressor. Although, requiring the EPU to start the APU results in a larger EPU, the additional EPU size and weight is substantially less than the size and weight of a starter.

These and other objects, features and advantages of the present invention are specifically set forth in or will become apparent from the following detailed description of a preferred embodiment of the invention when read in conjunction with the accompanying drawing.

DESCRIPTION OF THE PREFERRED EMBODIMENT

Figure 1:
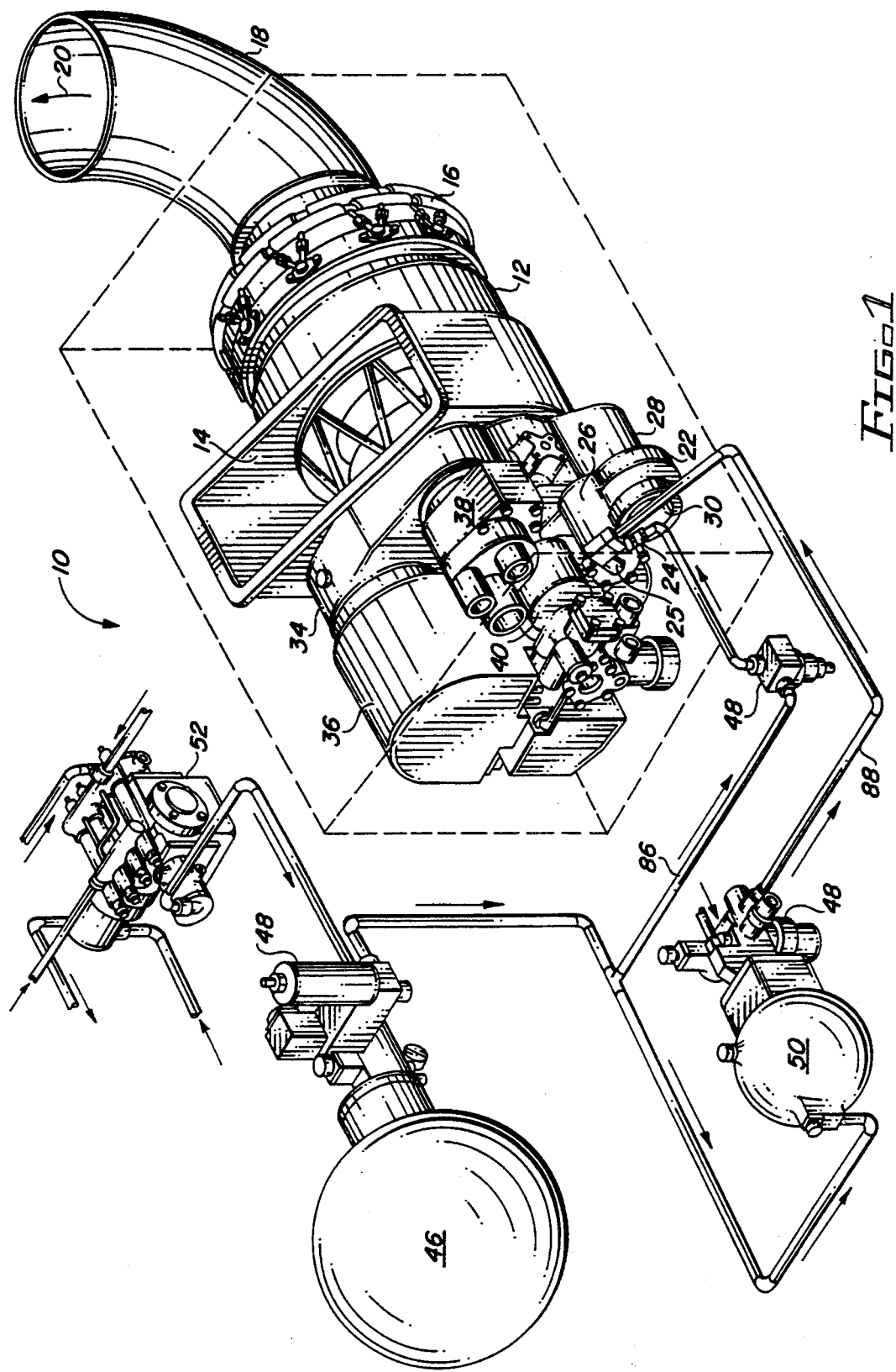
FIG. 1 is a perspective view of a secondary power system contemplated by the present invention.
Figure 2:
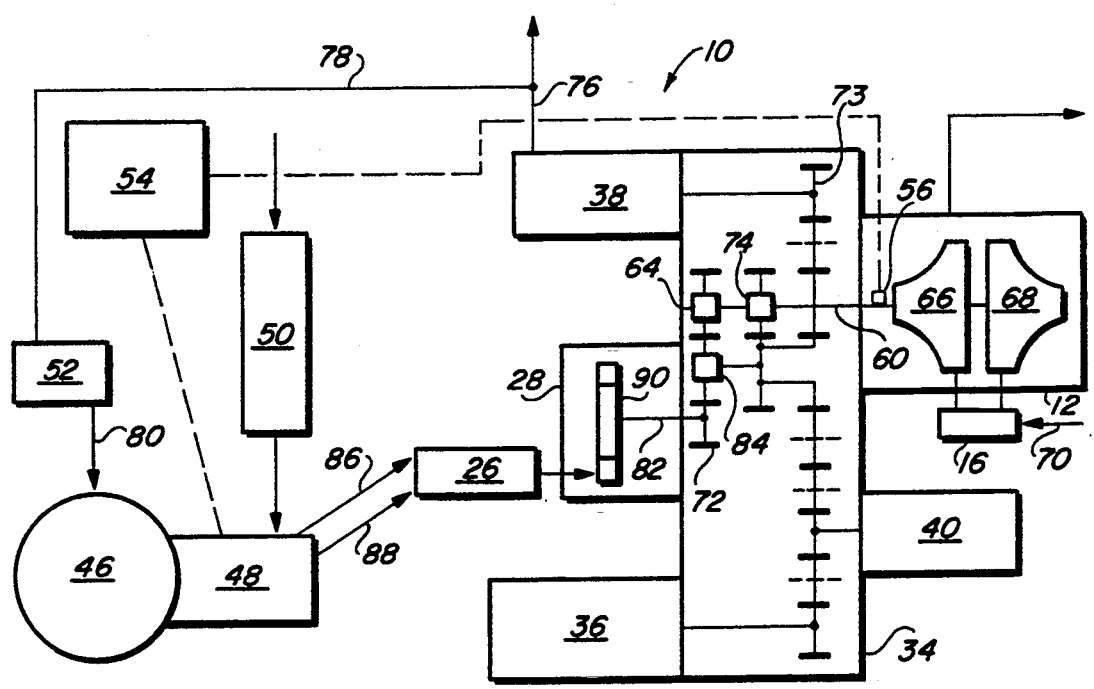
FIG. 2 is a schematic of the secondary power system of FIG. 1.

FIGS. 1 and 2 depict a secondary power system generally denoted by the reference numeral 10 which couples an APU 12 and an EPU 22 to a common gearbox 34.

The APU 12 is an air breathing gas turbine engine comprising in flow series arrangement an annular air intake opening 14, a compressor 66, a combustor 16 a turbine 68, and an exhaust duct 18. In operation, the APU 12 inducts ambient air via inlet 14, the compressor 66 pressurizes this air which is then mixed with a supply of jet fuel in the combustor 16 and ignited to form combustion products. The combustion products are then expanded over the turbine 68 and discharged from duct 18, as depicted by arrow 20. Thus, the APU 12 provides shaft power through a shaft 60. The APU 12 does not provide power for propulsion.

The EPU 22 includes an air inlet 24, a fuel inlet 25, a combustor 26, a turbine 90 supported in a turbine housing 28, and an exhaust outlet 30. During operation, a flow control unit or units 48 controls the flow of pressurized air from an air storage chamber 46 and the flow of jet fuel from a fuel storage chamber 50. The air and fuel are mixed and ignited to create combustion products in combustor 26. The combustion products from combustor 26 expand over turbine 90 and are discharged from exhaust outlet 30. Accordingly, the EPU 22 provides shaft power through a shaft 82. The EPU 22 does not provide power for propulsion.

Mounted in the gearbox 34 are two geartrains 72 and 73. Geartrain 72 includes two one way drive overrunning clutches 64 and 84, while geartrain 73 contains a single one way drive overrunning clutch 74. The clutches 64, 74, and 84 are preferably conventional sprag clutches having a driving race and a driven race that overruns or freewheels when the rotational speed of the driven race exceeds the rotational speed of the driving race. The EPU shaft 82 is coupled to the geartrain 72 through which shaft power or torque is transmitted to the driving races of the clutches 64 and 84. Likewise, the APU shaft 60 is directly coupled to the driving race of clutch 74 and the driven race of clutch 64. The driving races of clutches 74 and 84 are coupled to geartrain 73. The gears in geartrain 72 are configured so that the clutch 64 rotates at slower speed than shaft 82, thereby enabling the EPU 22 to drive the APU 12 through clutch 64. Accessory power devices including an electric generator 36, a hydraulic pump 38, and a lube pump 40 (in FIG. 2, device 40 is shown on the opposite side of gearbox 34 from FIG. 1 in the interest of simplicity of the schematic) are coupled to the gearbox 34 to be driven through geartrain 73.

The secondary power system 10 has two modes of operation. A normal mode in which the APU 12 is started and operated either on the ground or inflight, and an emergency mode in which the EPU 22 is started to drive the accessories and operated for period of time until the APU 12 can take over.

Prior to a start of the secondary power system 10, the clutches 64 and 84 are engaged and the clutch 74 is overrunning. In normal mode operation, upon receiving a start signal, an electronic or system control unit (SCU) 54 commands the flow control unit 48 to direct a controlled flow of pressurized air from storage chamber 46 to the combustor 26 through conduit 86. Simultaneously, the SCU 54 commands the fuel flow unit 48 to provide a scheduled flow of jet fuel from chamber 50 to the combustor 26 through conduit 88. The air and fuel are mixed and ignited in the combustor 26 producing a flow of high temperature pressurized combustion products that expand across the turbine 90 where it is converted to power for driving shaft 82.

Figure 3:
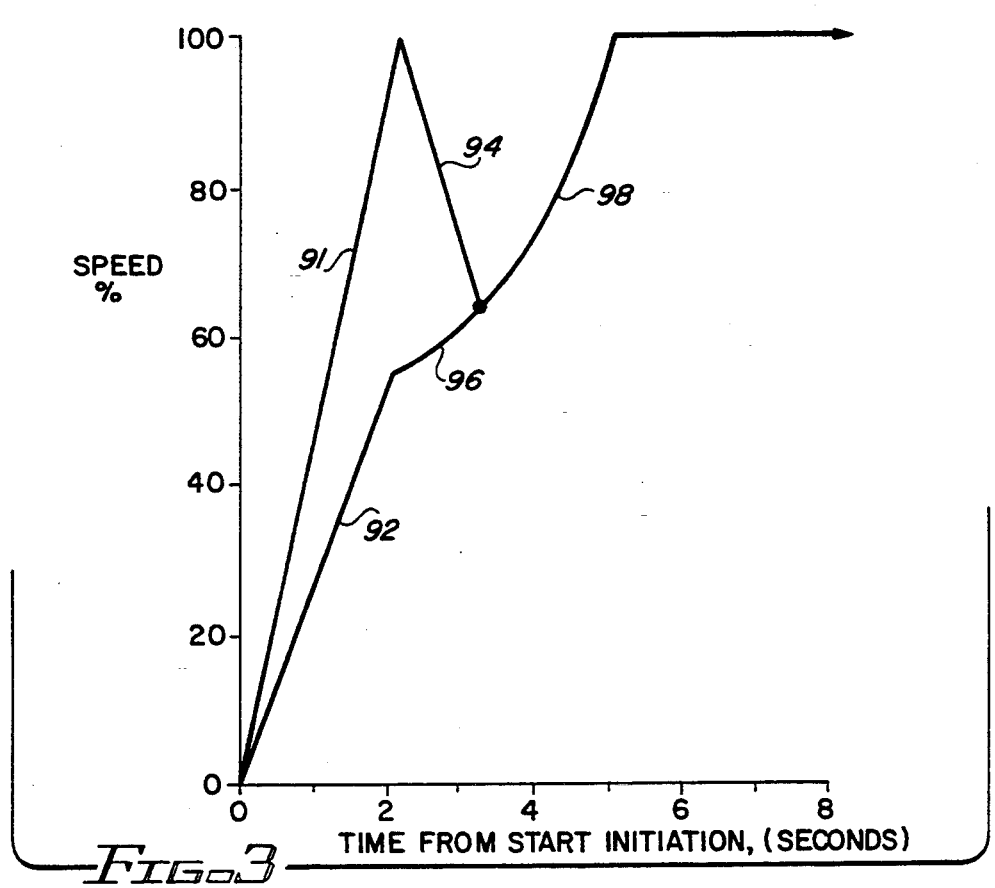
FIG. 3 graphically depicts the ground start sequence of the present invention.

FIG. 3 shows graphically this normal mode start sequence as engine percent speed vs. time for the APU 12, EPU 22, and accessories 36, 38, and 40. The operating line 91 shows that the EPU 22 is accelerated from 0–100% speed in about 2 seconds. As the EPU 22 comes up to speed, shaft power or torque is transferred from shaft 82 through clutch 84 and to geartrain 73 thereby simultaneously accelerating the accessories 36, 38, and 40 to their operating or rated speed. Concurrently, the EPU 22 also drives the APU 12, through clutch 64 up to a speed less than its operating or rated speed. This speed to which the APU is driven is its self-sustaining speed at its maximum operating altitude (i.e. worst condition). This is the minimum speed after which the APU can accelerate itself independent of the EPU 22. In the preferred embodiment, this self-sustaining speed is about 55% of the APU's operating or rated speed as shown by operating line 92, however this percent speed will vary depending on the particular APU configuration used. Clutch 74 is overrunning. A speed sensor 56 communicates to the SCU 54 when the APU 12 reaches this self-sustaining speed which in response commands a scheduled flow of jet fuel to the combustor 16 via a conduit 70. This fuel flow along with pressurized air from the compressor 66 are mixed and ignited and the APU 12 begins accelerating itself along with shaft 60 as represented by operating line 96. Because a droop in accessory power is not a problem during a normal mode start, as soon as the APU 12 becomes self accelerating, clutch 64 overruns and the SCU 54 reduces the air and fuel to the EPU 22 and the EPU 22 and accessories decelerate as represented by operating line 94 thereby saving stored air and fuel. When the percent speed of the APU 12 exceeds the percent speed of the EPU 22 and accessories, clutch 74 engages as clutch 84 overruns. The EPU 22 is shut down and the APU 12 and accessories accelerate to 100 percent speed as shown by operating line 98. The APU 12 reaches its rated speed in about 5 seconds which is considerably faster than 30 seconds to a minute required when starting power is provide by a starter motor. Thereafter, the secondary power system 10 operates as a conventional auxiliary power unit.

The secondary power system 10 includes a hydraulically driven air compressor unit 52. After the APU 12 reaches 100 percent speed, the air compressor unit 52 is operated under the control of the SCU 54 to recharge the pressurized air storage chamber 46. The compressor unit 52 receives hydraulic power from conduit 76 via a branch conduit 78 and draws in ambient air. This ambient air is delivered pressurized to the chamber 46 via a conduit 80.

During emergency mode operation, the EPU 22 is started by the SCU 54 as stated earlier. As in the normal mode, clutches 64 and 84 are initially engaged and clutch 74 is disengaged. The SCU 54 commands the flow control unit 48 to supply fuel and air to combustor 26 until the EPU 12 has reached approximately 99 percent speed. The EPU speed must be slightly below 100 percent speed to allow for sufficient speed differential between the driving and driven races of the clutches 74 and 84 so they can disengage when the APU 12 is accelerated to its rated speed. At this point, the accessories are providing full power and the APU 12 is motoring at just below its maximum altitude self-sustaining speed. The main difference in operation in the emergency power mode is that the accessories must be maintained at approximately 100 percent speed. The EPU 22 continues operating until the aircraft reaches ambient conditions at which the APU 12 can be started, or in a worst case scenario, until the stored air and fuel are depleted. The SCU 54 then schedules fuel to the combustor 16, ignition occurs, and clutch 64 overruns. The APU 12 accelerates and as it passes through 99 percent speed the clutch 74 engages and clutch 84 overruns. The APU 12 now drives the accessories at 100 percent speed and the EPU 22 is shutdown.

Once the APU is operating, the air compressor 52 is employed to recharge storage chamber 46 with pressurized air. Also, pressure is vented from pressurized fuel storage chamber 50 so that the latter may be recharged with jet fuel at a comparatively low pressure from the aircraft via conduit 50B. Once recharged with fuel the fuel storage chamber 50 is again pressurized by use of pressurized air from chamber 46.

In one alternative embodiment, the clutches 64 and 74 are removed and the EPU 22 drives the APU 12 through clutch 84 up to 99 percent speed, and in the emergency mode maintains the APU at 99 percent speed until ambient conditions are sufficient to allow an APU start. The APU 12 rotating unfired at 99 percent speed has a much larger drag than when rotating unfired at 55 percent speed. To overcome this larger drag the EPU 22 must produce more power which requires more oxidant resulting in larger and heavier chambers 46 and 50. Inlet guide vanes can be added to the APU 12 and operated to reduce some of this drag. However, with or without the inlet guide vanes, the applicants have found that the chambers 46 and 50 become so large as to make it impractical to use this embodiment in any application where there are severe weight and space constraints.

Another alternative embodiment replaces the clutch 64 with an active decoupler such as a fill-and-drain torque converter or a disc clutch. However, because torque converters require fill time and are less efficient than overrunning clutches, the chambers 46 and 50 must be larger and heavier than when used in the preferred embodiment.

Various modifications and alterations to the above described preferred embodiment will be apparent to those skilled in the art. Accordingly, this description of the invention should be considered exemplary in nature and not as limiting to the scope and spirit of the invention as set forth in the following claims.

What is claimed is:

1. A power system comprising:

a gearbox having a first clutch for transmitting power from a second geartrain to a first geartrain when engaged;

at least one accessory device coupled to said first geartrain;

an auxiliary power means coupled to said first geartrain;

a second clutch transmitting power from said second geartrain to said auxiliary power means when engaged;

an emergency power means coupled to said second geartrain for driving said accessory when said first clutch is engaged, and for driving said auxiliary power means when said second clutch is engaged; and a third clutch transmitting power from said auxiliary power means to said first geartrain when engaged and said first and second clutches are disengaged.

2. The power system of claim 1 wherein said first, second, and third clutches are one way drive overrunning clutches.

3. The power system of claim 1 wherein said first and third clutches are one way overrunning clutches and said second clutch is an active decoupler.

4. The power system of claim 1 wherein said second geartrain has a speed reduction such that when said emergency power means is operating at about its rated speed and is driving said auxiliary power means, said auxiliary power means is operating at a preselected speed.

5. The power system of claim 4 wherein said preselected speed is the self-sustaining speed of said auxiliary power means at its maximum operating altitude.

* * * * *